(No Model.)
L. G. & S. M. CHINNERY.
GASOGENE OR APPARATUS FOR MAKING AERATED BEVERAGES.
No. 399,739. Patented Mar. 19, 1889.
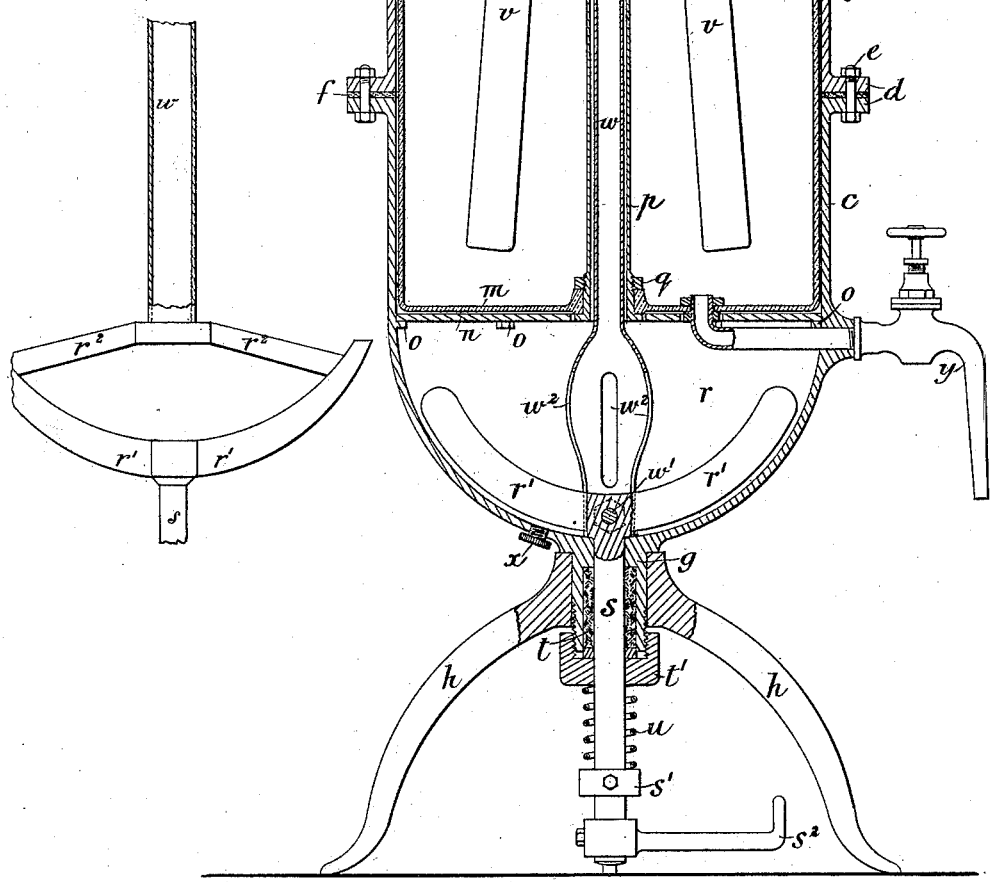
Witnesses. Inventor.

United States Patent Office.

LUTHER GEORGE CHINNERY AND SWARTZ MARTYN CHINNERY, OF LONDON, ENGLAND.

GASOGENE OR APPARATUS FOR MAKING AERATED BEVERAGES.

SPECIFICATION forming part of Letters Patent No. 399,739, dated March 19, 1889.

Application filed October 17, 1888. Serial No. 288,342. (No model.) Patented in Belgium June 19, 1888, No. 82,243.

*To all whom it may concern:*

Be it known that we, LUTHER GEORGE CHINNERY and SWARTZ MARTYN CHINNERY, subjects of the Queen of Great Britain, residing at London, England, have invented new and useful Improvements in Gasogenes or Apparatus for Making Aerated Beverages, (patented in Belgium June 19, 1888, No. 82,243,) of which the following is a specification.

Our invention relates to what are known as "gasogenes" or apparatus for making aerated beverages, and it comprises the improvements hereinafter described.

In the accompanying drawings, Figure 1 shows in central vertical section a gasogene constructed according to our invention. Fig. 2 is a detached view of a slightly modified arrangement of part of the apparatus.

$a$ is a cylindrical vessel having semi-spherical ends and composed of copper or other suitable metal. This vessel is formed in two parts, $b$ $c$, having flanges $d$ $d$ at their adjacent edges, the said flanges being united by bolts and nuts $e$, as shown in the drawings, or by any other suitable means, and having a packing-ring, $f$, between them to form a tight joint. The lower part, $c$, of the vessel has formed integral with it a boss, $g$, which is fitted into and adapted to rotate in a bearing in the stand $h$, as shown. The upper end of the vessel is provided with an aperture, $i$, which is normally closed hermetically by a cover, $j$, which, as shown, is held in place by a stirrup and screw, $k$, a packing-ring, $l$, being placed between the cover and the vessel to form a tight joint.

$m$ is a glass water-chamber, which is placed within the chamber $a$, and which is carried by a plate, $n$, in the lower part, $c$, of the chamber, the said plate being supported upon lugs $o$ $o$. At the bottom of the said chamber $m$, at the center, is a small boss having an aperture for the insertion of a long internal tube, $p$, which rises nearly to the top of the said chamber, and is secured by a screw-collar, $q$, or it may be secured in any other suitable manner.

If desired, the tube $p$ may be formed in one piece with the chamber $m$. The aforesaid chamber is slightly smaller in diameter than the interior of the metal cylinder, so as to permit the carbonic-acid gas to surround the chamber outside as well as inside, and thereby equalize the pressure on the interior and exterior of the said glass chamber.

The space $r$ beneath the plate $n$ serves as a chamber for the generation of carbonic-acid gas by means of acid and alkali, which we insert therein from the top of the metal vessel, in the manner hereinafter described; or it serves as a gas-washing chamber when prepared carbonic-acid gas is used instead of acid and alkali, which prepared gas we insert or inject by attaching a metal flask containing the gas to the lower part of the vessel.

In the gas-chamber $r$ is located an agitator having two arms, $r'$, as shown, or any other desirable number of arms. This agitator has a vertical spindle, $s$, descending through a stuffing-box, $t$, formed in the boss $g$, a gland, $t'$, being placed at the bottom of the said boss for compressing the packing in the stuffing-box.

A spring, $u$, is placed on the spindle $s$ and bears at one end under the gland and at the other end upon an adjustable collar, $s'$, fixed to the lower part of the spindle, the said spring serving to prevent the agitator from rising when the spindle is oscillated by means of the handle $s^2$, secured to the bottom of the spindle.

In addition to the lower agitator, we find it advantageous to employ an agitator, $v$, in the upper or water chamber. This second agitator $v$ is attached to the upper end of a vertical tube, $w$, passing through the tube $p$, fixed to the water-chamber $m$, the lower part of which tube $w$ is connected to the agitator $r'$ and secured by a bolt $w'$, or a pin.

The tube $w$ is in Fig. 1 shown enlarged at its lower end, and has slots or apertures $w^2$ therein for the purpose of permitting the acid and alkali which are passed through the tube $w$ from the opening $i$ to find egress into the lower or gas chamber; but in the case of large-sized apparatus we prefer the arrangement shown in Fig. 2, in which the bottom of the tube opens direct into the lower chamber, $r$, and is connected to the agitators $r'$ $r'$ by arms $r^2$ $r^2$. This arrangement allows of the acid and alkali passing into the lower or gas chamber without risk of clogging the tube $w$.

The arms of the agitator $v$ extend down into the chamber $m$, so that on vibrating the lever $s^2$ not only will the chemicals in the gas-chamber be stirred up, but at the same time the gas contained in the upper chamber will be thoroughly mixed with the water contained in the chamber $m$. By operating the agitators from the bottom of the apparatus the escape of gas is prevented, only water being near the stuffing-box. Near the bottom of the gas-chamber we form a hole fitted with a small plug, $x$, by removing which the remains of the exhausted charge of acids and alkali can be discharged.

$y$ is a draw-off tap, which is connected with the glass chamber at the bottom; or the cock may be attached to a tube depending into the glass chamber through the opening at the top thereof, or through a separate opening formed for the purpose.

In charging the apparatus the water-chamber $m$ is first filled, and then the acid and alkali are inserted through the tube $w$ into the gas-chamber $r$, followed by a small quantity of water to generate the gas. The aperture at the top of the vessel is then closed and the agitators are operated, after which the liquid, which is now aerated, can be drawn off as required.

By mounting the vessel on a stand in the manner hereinbefore described the said vessel can be turned so that liquid can be drawn at either side without necessitating the moving of the whole apparatus.

Having now particularly described and ascertained the nature of our said invention and in what manner the same is to be performed, we declare that what we claim is—

1. A gasogene or apparatus for the manufacture of aerated beverages, comprising a vessel divided into two compartments, the upper one of which is provided with a loosely-fitting glass chamber for containing the liquid to be aerated, while the lower serves for the generation of gas, each of the said chambers containing an agitator, the spindle carrying the upper agitator being made tubular for the introduction of the gas-producing materials into the lower chamber, substantially as described.

2. A gasogene having, in combination, a vessel, $a$, mounted on a stand and provided in its upper part with an interior upper glass chamber, $m$, for the liquid, and open at its top, and with a clear space between said vessel and chamber, said glass chamber having a central tube, $p$, extending nearly to its top, said vessel $a$ having a gas-chamber, $r$, located beneath the chamber $m$, and a vertical tube, $w$, extending nearly through the tube $p$ and surmounted by agitators, as set forth.

3. In combination, the stand $h$, vessel $a$, open-top glass chamber $m$ for liquid and serving to equalize the gas-pressure, vertical tubes $p$ $w$, vertical spindle $s$ and its stuffing-box, gas-chamber $r$ beneath chamber $m$, handle $s^2$ on the spindle $s$ and beneath the stand, and agitators within each chamber, all substantially as and for the purposes set forth.

LUTHER GEORGE CHINNERY.
SWARTZ MARTYN CHINNERY.

Witnesses:
G. F. REDFERN,
B. BRADY.